Patented June 17, 1952

2,600,627

UNITED STATES PATENT OFFICE 2,600,627

PROCESS OF TREATING SHRIMP

Karl C. Envoldsen, Cleveland, Ohio

No Drawing. Application October 4, 1947,
Serial No. 778,050

6 Claims. (Cl. 99—111)

This invention relates to a process of treating shrimp preparatory to eating.

It has been a common impression in both commercial and domestic preparation of shrimp that to cook the same prior to eating it was advisable to immerse the shrimp in boiling water for a considerable period of time, such as 10 or 15 minutes. It is also common practice to immerse shrimp in boiling water or brine prior to shelling the same and permit them to stay in the boiling liquid until the shrimp meat separates from the shell, which usually requires 20 to 30 minutes. I have found that shrimp which have been treated in this manner are objectionable from the standpoint of being overcooked. Their texture is tough and rubbery, accompanied by a substantial loss of flavor, coloring, etc. It is therefore an object of the present invention to provide a process of treating shrimp, which shrimp are prepared for eating in such manner as to preserve and enhance their appearance, color and flavor and also to give the shrimp meat an especially desirable and appetizing texture which may best be described as tender and crisp.

Another object is to provide a process for treating shrimp which can be carried out quickly so as to minimize the time during which the shrimp are removed from a cool storage temperature to prevent quality loss and bacterial spoilage.

Other objects and advantages will become apparent to those skilled in the art from the following description of the process.

It is believed that the above mentioned practice of boiling shrimp bodies for a considerable period of time in order to prepare them for eating is the result of the inability to definitely ascertain or rely on the freshness and condition of a shrimp body and it is therefore customary to overcook the shrimp bodies to insure that all objectionable odors and possibility of bacterial action are removed. During this cooking process the flesh of the shrimp bodies deteriorates considerably and becomes toughened and rubbery. A large portion of the delicate flavor is lost by the action of the boiling water for such extended time periods. It is believed that such protracted boiling results in a loss of the ester content and the loss of soluble solids such as portions of the protein or albumen content. The esters are desirable as they provide a savory fragrance to the shrimp, while the soluble solids comprise a portion of the food content of the shrimp. Also during such prolonged cooking the shrimp bodies may acquire extraneous undesirable flavors such as that of the excretory tract of the shrimp as well as that of the slime or fluid present between the body and shell of the shrimp. Further, the appearance of the finished product is grayer, duller and less desirable. In the present invention the shrimp bodies are treated for a shorter period of time at a considerable less heat so that the desirable properties of the shrimp bodies are not deleteriously affected.

In carrying out the process embodying the present invention the shrimp bodies are shelled, the sand veins are removed and the bodies are washed to remove sand, grit or other foreign matter. It is desirable to accomplish the shelling, deveining and cleaning processes in as short a time as practicable so as to minimize the exposure of the shrimp bodies to the atmosphere and warmth of normal room temperatures as much as is possible. Following the shelling, deveining and cleaning steps, the shrimp bodies may be immersed in a suitable treating liquid. One such treating liquid is a saline or common salt solution of relatively high concentration, such as about 20° to 40° salinometer or even as high as 90° salinometer, which treating solution is desirable for carrying out the objects of the invention and properly flavoring the shrimp bodies.

Another desirable treating fluid comprises a solution of salt and sugar with or without spices according to the flavor desired in the finished product.

While so immersed or subsequent thereto the shrimp bodies may be subjected to temperatures at which the beneficial effects of heat may be obtained without the objections accruing from too much heat. The heat to which the shrimp are subjected should be less than the boiling temperature of water. A permissible range for accomplishing the present invention varies from approximately 170° F. to 210° F. Even at the higher portion of the temperature range there is no boiling as the presence of the salt in the solution appreciably increases the boiling temperature of the solution. It is believed desirable to accomplish the cooking of the shrimp at as low a temperature as possible and therefore it is preferable to carry out the cooking in the lower portion of the range, that is, in the region of 180° F.

An especially recommended method of accomplishing the heat treatment of the present invention is to advance the shrimp in suitable containers through successive baths, including in sequence the bath of the treating liquid, a heated bath which may also comprise the treating liquid at the proper temperature, followed by a bath for cooling and washing the shrimp. The time of immersion in each bath may be controlled by the speed of the advancing means or the length of the path of the shrimp container through the bath. The heated bath may be heated in any suitable manner, such as by a gas flame or by electrical resistance elements disposed around or immersed in the bath. To closely control the temperature of the cooking process it is desirable to utilize thermostatic controls.

The time for subjecting the shrimp to a treating temperature will vary in accordance with the size and quantity of the shrimp undergoing treatment and also according to the temperature of the bath. Under the conditions outlined the cooking time may vary from approximately 3 to 8 minutes, it being kept in mind that the cooking time should be no longer than is necessary.

During the actual cooking of the shrimp, the shrimp bodies are unable to absorb the seasoning or spices, as evidenced by the fact that during the cooking process the bodies are contracting, that is, they are giving off substances and therefore incapable of simultaneously absorbing other substances. Therefore, the seasoning and spicing of the shrimp must be carried out either prior to or subsequent to the actual cooking operation. For this reason it is desirable to add the flavoring ingredients to the treating liquid bath as well as the cooking bath. Suitable spices for use are peppers, thyme, bay, vinegar and the like. The spices should be selected with a view to their purpose, namely, to destroy or overcome all possibility of a fishy flavor or aroma, and in addition to bring out the natural flavor of the fresh shrimp.

After the shrimp have been exposed to the treating liquid and the cooking bath they may be immersed in a cooling bath to wash the shrimp and remove any excess salt and spicing material and to provide a rapid cooling action. The cooling bath may comprise a treating liquid, such as the brine or brine and sugar solutions previously described, or may comprise merely cool water. To effectuate rapid cooling the immersion in a cool bath may be followed by exposure by immersion or flowing of an icy treating liquid or ice water over the shrimp bodies. When the temperature of the shrimp bodies has been rapidly lowered, they may then be drained, placed in suitable storage containers and disposed in a cooler for storage until use or sale. The rapid cooling of the shrimp bodies is highly important in order to maintain them at the peak of their flavor and texture as well as to prevent bacterial action resulting in spoilage.

While the action is not clearly understood, it appears that the immersion in a treating solution and the use of a treating temperature lower than the boiling point of water produces the desired result of rendering the flesh of the shrimp body firm while at the same time tender and crisp. The color of the shrimp body is appreciably whiter and the characteristically mottled pink of the fresh shrimp is more accurately preserved. The appearance of the shrimp body is considerably improved over shrimp prepared in the normal manner. Shrimp bodies are more glossy and smoother appearing as contrasted with having a dull and dead appearance. At the same time the heat is sufficient to kill bacteria, and prevent spoilage by bacterial action for a considerable period, especially when the shrimp are maintained at the desirable refrigerating temperature of 38° to 45° F.

The shrimp bodies resulting from treatment according to the present invention are a vastly improved shrimp product, as may readily be determined by observation alone as well as by taste. Such shrimp are whiter in color and considerably more crisp and tender in texture. When placed side by side with shrimp cooked by conventional methods, shrimp treated according to the present invention provide a marked contrast, the increased whiteness tending to predominate over the pink areas whereas in a conventionally treated shrimp the pink areas tend to dominate over the dullish white areas. Their flavor and fragrance is preserved and brought out by the treatment described above.

In addition the present treating process decreases to a minimum the loss of food value. When the shrimp are cooked at lower temperatures, portions of the protein matter which are soluble only at high temperatures and the other soluble solids are not removed, which is the case when shrimp are cooked by conventional methods.

It will be understood that the foregoing description of preferred embodiments of the invention is for the purpose of explanation and illustration and is not intended to limit the scope of the invention as described and claimed in the following claims.

What I claim is:

1. The process of treating shrimp preparatory to eating to preserve their flavor, appearance and food content which comprises, immersing a plurality of shrimp bodies in an aqueous treating liquid having a salinity corresponding to 20° to 90° salinometer, subjecting said shrimp bodies to a heated aqueous liquid at a temperature between 170° F. and 210° F. for a time of about three to about eight minutes, rapidly cooling said bodies in an icy liquid and draining said shrimp bodies.

2. The process of treating shrimp preparatory to eating to preserve their flavor, appearance and food content which comprises shelling, deveining and cleaning a plurality of shrimp bodies, immersing said bodies in an aqueous solution including seasoning ingredients and having a salinity of at least 20° salinometer, subjecting said shrimp bodies to a temperature between 170° F. and 210° F. while so immersed, and rapidly cooling said shrimp bodies.

3. The process of treating shrimp preparatory to eating to preserve their flavor, appearance and food content which comprises immersing said shrimp in a saline solution, transferring said shrimp to a saline bath heated to a temperature between 170° F. and 210° F. and having a salinity of at least 20° salinometer, maintaining the shrimp in said bath at said temperature for from about three to about eight minutes, and rapidly cooling said shrimp by immersion in cooled water and storing said shrimp at about 38° C. to about 45° C.

4. The process of treating shrimp preparatory to eating to preserve their flavor, appearance and food content which comprises immersing said shrimp in an aqueous treating solution containing sugar and having a salinity of 20° to 40° salinometer, transferring said shrimp to an aqueous bath heated to temperature of between 170° F. and 210° F., subjecting said shrimp to said heated bath for three to eight minutes, transferring said shrimp to a chilled cooling bath of treating liquid to rapidly cool said shrimp, removing said shrimp from said bath, draining said shrimp and storing said shrimp under refrigerated conditions.

5. The process of treating shrimp preparatory to eating to preserve their flavor, appearance and food content which comprises shelling and deveining a plurality of shrimp bodies, cleaning said shrimp bodies, immersing said shrimp bodies in an aqueous treating liquid at room temperature having a salinity of at least 20° salinometer, immersing said bodies in an aqueous cooking liquid at a temperature between 170° F. and 210° F., maintaining said shrimp in said liquid at said temperature for about three to eight minutes, and rapidly cooling to a refrigerating temperature and draining said shrimp bodies.

6. A process of cooking and treating shelled and cleaned shrimp to preserve their flavor, appearance, and food content comprising immersing said shrimp bodies in an aqueous treating bath at room temperature having therein a salinity of 20° to 40° salinometer, sugar, and other seasoning, immersing said shrimp in an aqueous cooking liquid at a temperature between 170° F. and 210° F., maintaining said shrimp in said liquid at said temperature for about three to eight minutes, and rapidly cooling to a temperature between about 38° and about 45° F. and draining said shrimp.

KARL C. ENVOLDSEN.

REFERENCES CITED

The following references are of record in the file of this patent:

UNITED STATES PATENTS

| Number | Name | Date |
| --- | --- | --- |
| 1,214,392 | Trescott | Jan. 30, 1917 |
| 1,404,352 | Eaton et al. | Jan. 24, 1922 |
| 1,927,123 | Howe | Sept. 19, 1933 |
| 2,297,411 | Henning | Sept. 29, 1942 |
| 2,488,184 | Garnatz | Nov. 15, 1949 |

FOREIGN PATENTS

| Number | Country | Date |
| --- | --- | --- |
| 161,689 | Great Britain | Apr. 15, 1921 |

OTHER REFERENCES

"The Freezing Preservation of Foods," 1943, by Tressler and Evers, published by The Avi Publishing Co., Inc., New York.